United States Patent

[11] 3,586,260

[72] Inventors John H. Looney
Webster, N.Y.;
Arthur D. Clay, Woodland Hills, Calif.
[21] Appl. No. 743,829
[22] Filed July 10, 1968
[45] Patented June 22, 1971
[73] Assignee The United States of America as represented by the Secretary of the Navy

[54] FILM TRANSPORT AND CONTROL FOR STREAK CAMERA
7 Claims, 1 Drawing Fig.
[52] U.S. Cl..................................................... 242/208, 242/186, 352/84
[51] Int. Cl. .................................................. G03b 1/04, G03b 39/00
[50] Field of Search........................................... 242/186, 187, 188, 189, 190, 191, 201, 204, 205, 206, 207, 208, 209, 211, 182, 183, 184, 185; 95/31, 36 T, 36; 352/84

[56] References Cited
UNITED STATES PATENTS
3,071,332 1/1963 Dain et al. ..................... 242/182
3,259,448 7/1966 Whitley et al................. 352/84

Primary Examiner—George F. Mautz
Attorneys—G. J. Rubens and Henry Hansen

ABSTRACT: A film transport and control system for a streak camera having a film takeup reel selectively driven by kinetic energy stored in a flywheel which is rapidly accelerated from a standstill to a preselected high angular velocity by a relatively low horsepower electric motor. When building up the flywheel energy, two motor-to-flywheel ratios are utilized. At the preselected velocity, the film can be accelerated and maintained at a preselected speed by an electromagnetic clutch between the flywheel and takeup reel. A brake on the supply reel critically dampens the system hen the film reaches approximately 80 percent of the preselected speed.

PATENTED JUN 22 1971
3,586,260
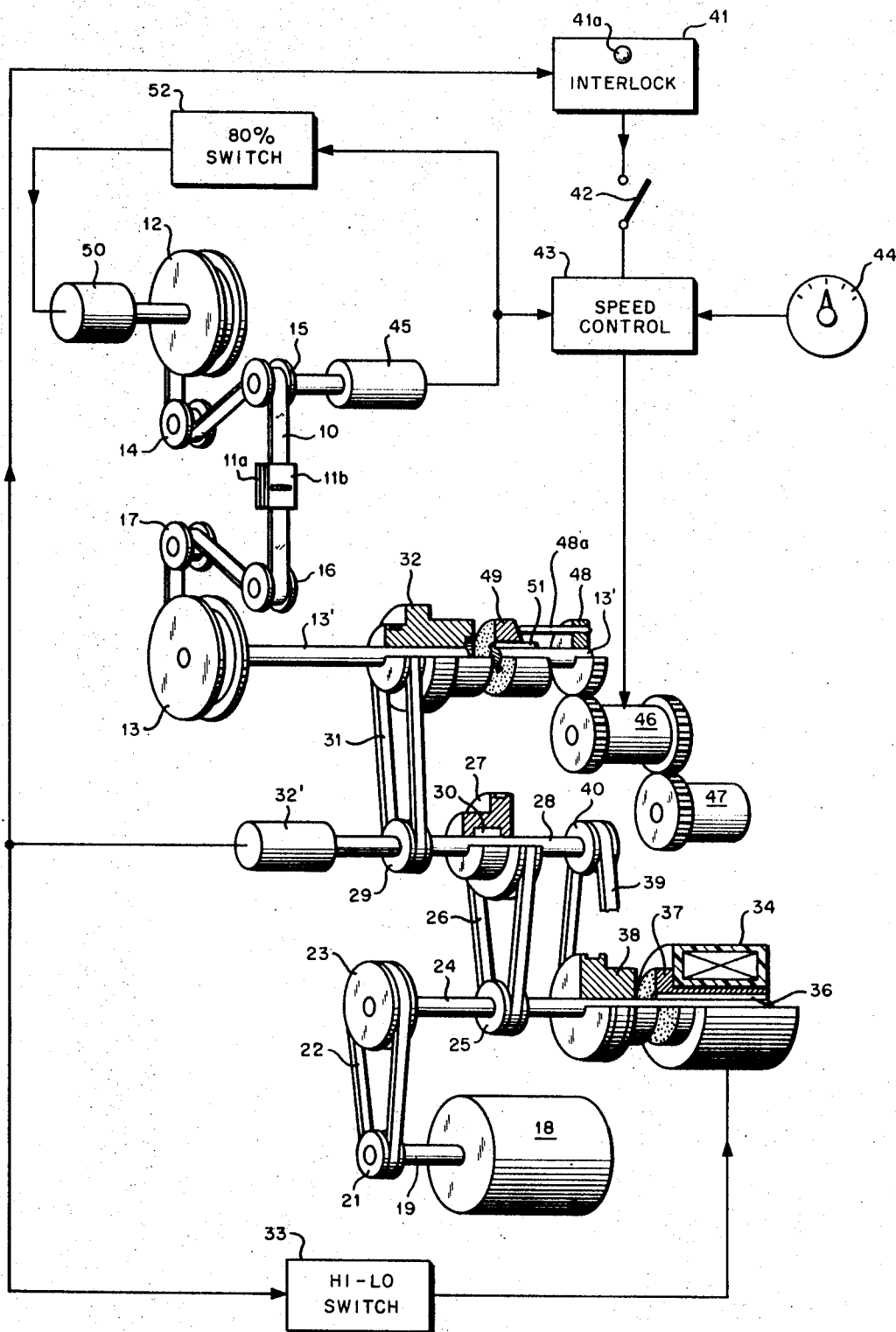
INVENTORS
JOHN H. LOONEY
ARTHUR D. CLAY
BY
*Henry Hansen*
ATTORNEY mechanically connected at its output supply reel 12. A brake switch 52 responsive to the output from tachometer 45 produces an electrical output signal which is applied to the brake 50 as the film 10 approaches the preselected speed. In the illustrated embodiment, the switch 52 is set to operate at approximately 80 percent of the preselected film speed. Thus, during acceleration of the film 10 minimum energy is necessary, but as the film 10 reaches the speed critical damping can be applied.

Though not shown, it is contemplated that when the entire load of film 10 is exhausted from the supply reel 12, an end-of-film switch will shut off all camera power and a self-energizing brake, released by a holding solenoid, will rapidly decelerate the flywheel and allow immediate access to the film 10 by an operator.

SUMMARY OF OPERATION

Operation of the invention will now be summarized as related to the aforementioned specific application of recording the irradiance history profile of a nuclear explosion. It is understood, of course, that this is merely exemplary and is not intended to limit the invention except to the extent set forth in the appended claims. A film speed is selected on selector 44, e.g. 225 feet per second. At some time well before nuclear detonation time $t$ such as $t-10$ (minutes), the motors 18 and 47 are energized. Flywheel 32 is accelerated to a velocity capable of transporting the film 10 at the preselected peak film speed of 225 feet per second. At some intermediate velocity during acceleration, the output from switch 33 causes pulley 38 to drivingly engage with motor 18 and cause shaft 28 to overrun pulley 27 and finally accelerate flywheel 32 to an angular velocity at least sufficient to produce a sustained 225 feet per second film speed for the total film footage on supply reel 12. When the angular velocity is reached, the output from tachometer 32' lights indicator 41a to inform the operator that the camera is ready to be triggered for film transport. With no signal output appearing at the output of speed control 43, cam 49 is completely disengaged from flywheel 32; but when an underspeed error signal appears upon closure of switch 42, cam 49 frictionally engages flywheel 32 to start takeup reel 13 rotating. In one embodiment actually constructed according to the invention, the 225 feet per second film speed was attained in slightly over 1 second and was maintained at constant speed for at least 4 seconds as determined by the amount of film on the supply reel 12. A 2-microseconds resolution was manifested with a 3-mil. slit in the front plate 11b.

It will be understood that various changes in the details, materials, steps and arrangements of parts, which have been herein described and illustrated in order to explain the nature of the invention, may be made by those skilled in the art within the principle and scope of the invention as expressed in the appended claims.

We claim:
1. In a streak camera having a pair of rollers for guiding strip film through the focal plane from a supply reel to a takeup reel, a backplate tangential to the contact surfaces of the rollers at the focal plane of the camera, and a front plate juxtapositioned parallel to the backplate with an elongated slit formed therein normal to the length of the film; a film transport and control system comprising:
   shaft means (13') formed to axially extend from the takeup reel;
   flywheel means (32) coaxially mounted on said shaft for independent rotation;
   motor means (18);
   transmission means (25, 27, 38, 40) having a plurality of speed ratios selectively connected in driving relation between said motor means and said flywheel means;
   first control means (32', 33, 37) responsive to the flywheel angular velocity for connecting respective speed ratios of said transmission means in selected velocity ranges; and
   second control means (45, 43, 44, 46, 47, 49) responsive to the film speed for drivingly connecting said flywheel to said shaft according to a selected speed.

2. Apparatus according to claim 1 further including:
   interlock means (41) responsive to the flywheel angular velocity producing an output signal for disabling said second control means below a preselected angular velocity.

3. Apparatus according to claim 2 wherein said interlock means further includes:
   a manual switch (42) interposed in the output signal to said second control means.

4. Apparatus according to claim 2 further including:
   brake means (50,52) responsive to the film speed and formed to impart critical damping to the supply reel above a preselected film speed.

5. Apparatus according to claim 4 wherein said brake means further includes:
   switch means (52) receiving a signal indicative of the film speed and producing an output signal indicative of approximately 80 percent of said film speed; and
   electromagnetic brake means (50) mechanically connected to the supply reel and receiving said switch means output signal for braking said supply reel.

6. Apparatus according to claim 1 wherein said transmission means further includes:
   a first shaft (28) drivingly connected to said flywheel means;
   a first driven wheel (27) including an overrunning clutch coaxially connected to said first shaft for driving said first shaft when the shaft velocity is less than the first driven wheel velocity;
   a second driven wheel (40) coaxially fixed to said first shaft for rotation therewith;
   a second shaft (24) drivingly connected to said motor means;
   a third wheel (25) coaxially fixed to said second shaft for rotation therewith and drivingly connected to said first wheel;
   a fourth wheel (38) coaxially mounted on said second shaft for independent rotation and drivingly connnected to said second wheel, the diametral ratio of said first to third wheel being less than said second to third wheels;
   clutch means (37) coaxially mounted on said second shaft for rotation therewith and slidable along the axis thereof for frictionally engaging and rotating said fourth wheel;
   actuator means (34) operatively connected to said clutch means for effecting said frictional engagement;
   switch means (33) responsive to the flywheel angular velocity energizing said actuator means in one of said selected velocity ranges.

7. Apparatus according to claim 1 wherein said second speed control means further includes;
   cam means (49) coaxially mounted on said shaft means for rotation therewith and slidable along the axis thereof for frictionally engaging and rotating said flywheel means;
   cam follower means (48, 48a) coaxially mounted on said shaft means for rotation relative thereto and operatively connected for axially positioning said cam means according to the relative angular position of said follower means;
   clutch means (46) having an output shaft drivingly connected to said follower means, the angular velocity of the output shaft being in accordance with an input control signal;
   sensor means (45) responsive to film speed producing a signal indicative thereof;
   selector means (44) producing a signal indicative of a manually selected film speed; and
   error signal means (43) receiving said sensor and selector means signals and providing said input control signal to said clutch means.

FILM TRANSPORT AND CONTROL FOR STREAK CAMERA

BACKGROUND OF THE INVENTION

The present invention relates to a to a control system transport control system for a camera, and more particularly to a control system for quickly transporting film from standstill in a streak camera without significant degradation of time resolution of the recorded information.

Direct viewing of the fireball resulting from a nuclear explosion can cause flashblindness and retinal damage to the viewer. It is desirable, therefore, in the development of new techniques and apparatus for the protection of the viewer's eyes, to accurately measure and record the retinal energy history (irradiance or illuminance vs. time) caused by the fireball. One technique of the prior art directly records the retinal image on film with a shutter-type camera. Another technique utilizes a photoelectric detector whose output is fed to an oscilloscope, oscillograph, or tape recorder. In the first technique, an integrated measurement instead of a synoptic measurement, is obtained. In the second case, state of the art photoelectric detectors have too low a sensitivity. Furthermore, when used with an oscilloscope the total recording time is too limited, and when used with an oscillograph or tape recorder, fidelity of the recordation is degraded beyond acceptability. On the other hand, streak cameras of the prior art provide continuous measurements and would be ideally suited except that they do not afford the time resolution required to render the measurements useful for the scientific study and technological development contemplated and indicated hereinablve.

SUMMARY OF THE INVENTION

Accordingly, it is the general purpose of the present invention to provide a high-speed streak camera having superior time resolution over prior art streak cameras whereby the irradiance history of sudden bursts of retinal energy such as developed by a nuclear explosion are accurately recorded.

This is accomplished with a streak camera having an improved film transport and control system therein for rapidly accelerating the film from standstill to a preselected peak speed, and for maintaining the film speed substantially constant for the remainder of film footage on the supply reel. Upon energizing a drive motor, a flywheel is accelerated through a two-ratio transmission to a preselected angular velocity, whereupon the flywheel is drivingly connected to the film takeup reel to commence film transport. A speed-responsive clutch regulates the drive connection between the takeup reel and the flywheel as a function of the film speed. The system also includes a speed-responsive brake connected to the supply reel for critically damping the system as the film approaches the preselected peak speed.

BRIEF DESCRIPTION OF THE DRAWING

In the drawing, one embodiment of the film transport and control system according to the invention is illustrated in diagrammatic form with some of the mechanical elements in cross section to show their operation more precisely and with electrical elements in one-line block diagram form.

DESCRIPTION OF THE PREFERRED EMBODIMENT

Referring now in more detail to the drawing, a highly sensitive photographic film 10 is shown passing from a supply reel 12 to a takeup reel 13 over flanged rollers 14, 15, 16 and 17. The rollers 15 and 16 are positioned at each end of the focal plane of an optical system, not shown, of a streak camera. As the film 10 goes through the focal plane, it passes between two parallel plates 11a and 11b, the backplate 11a being tangential to the contact surface of the rollers 15 and 16. The front plate 11b contains a slit for passing the light to the film from the optical system. It is contemplated that the plates 11a and 11b be separated by only about 0.0001 inch in excess of the film thickness to achieve best film positioning. Entrapment of air carried between the plates by the rapidly moving film provides a thin air cushion on each surface of the film as it passes between the parallel plates, thus providing effective support of the film by holding it precisely aligned with respect to the slit yet preventing scratching of the film since neither the emulsion nor the backing is in sliding contact with metal surfaces.

Kinetic energy, transferred to the takeup reel 13, is utilized for acceleration and speed maintenance of the film 10, which energy is provided by a DC motor 18 and stored in a flywheel 32. For building up the flywheel energy, the motor output at shaft 19 is transmitted first through belt 22 on pulleys 21 and 23 to a shaft 24, then through belt 26 on pulleys 25 and 27 to a shaft 28, and finally through belt 31 on pulley 29 and flywheel 32. Pulleys 21, 23, 25 and 26 are affixed to their respective shafts for rotation therewith. Pulley 27 includes an overrunning clutch 30 which disestablishes a drive connection from pulley 27 to shaft 28 when the latter is rotating faster than pulley 27.

It is contemplated that a relatively small, low-horsepower DC motor 18 be used to impart the kinetic energy to the flywheel 32. To accomplish this without substantially extending the total acceleration time from flywheel standstill to peak velocity, after which the takeup reel 13 can be engaged to transport the film 10, two motor-to-flywheel ratios of transmission are utilized. Pulley 27 drives shaft 28 in a low-ratio during the first phase of flywheel acceleration. A DC tachometer 32' driven by shaft 28 senses the angular velocity of the flywheel 32 and provides a corresponding signal to a "Hi-Lo" control switch 33. Above a preselected angular velocity, switch 33 energizes an electromagnetic clutch 34 to change the motor-to-flywheel transmission ratio from low to high speed. The switching point is set just below peak velocity of the motor 18. When clutch 34 is energized, a plunger 37 mounted on shaft 24, and axially slidable relative thereto, frictionally engages a pulley 38 affixed to shaft 24 for rotation therewith. A spline 36 between shaft 24 and plunger 37 maintains concomitant rotation thereof. A belt 39 and a pulley 40 affixed for rotation with shaft 28 provide a driving connection to flywheel 32.

Tachometer 32' also provides flywheel velocity signal to an interlock control 41 which is compared to the preselected film speed signal from a speed selector 44. When the tachometer signal reaches a fixed value relative to the selector signal, a light 41a is energized and an operational signal appears at a switch 42. Film transport can now be initiated by closing switch 42 which enables a speed control 43. A film speed signal derived from a tachometer 45 driven with roller 15 is compared with the selected speed signal from selector 44, and a signal proportional to the magnitude and polarity of their difference or error is fed to an electric clutch 46, such as the Hall effect or eddy current type, whereby the error signal varies the output speed as a corresponding percentage of the input speed. The input speed is maintained constant by a synchronous motor 47 which may be energized at the time of motor 18. The clutch output drives a gear 48 and cam follower 48a axially extending therefrom. A cam 49, drivingly connected to takeup reel 13 through a shaft 13' and a spline 51, has its cam surface slidably urged against the follower 48a by spring means, not shown. Any relative motion between gear 48 and shaft 13' will slide cam 49 into or out of frictional engagement with flywheel 32. In the illustrated embodiment and as viewed from the right end of shaft 13', clockwise rotation of gear 48 relative to cam 49 caused by an underspeed error signal to clutch 46 will cause frictional engagement of cam 49 and flywheel 32, thus establishing a drive connection between flywheel 32 and takeup reel 13. Conversely an overspeed signal will disestablish the flywheel-to-takeup reel drive connection.

To insure against film speed overshoot which will loosen the film loop and result in film breakage, the film supply system is critically damped by an electromagnetic brake 50 which is